United States Patent [19]

Stocker

[11] Patent Number: 4,790,205
[45] Date of Patent: Dec. 13, 1988

[54] CABLE FLEXIBLE JOINT

[75] Inventor: Raymond Stocker, West Bloomfield, Mich.

[73] Assignee: Ford Motor Company, Dearborn, Mich.

[21] Appl. No.: 941,877

[22] Filed: Dec. 15, 1986

[51] Int. Cl.⁴ .............................................. F16C 1/10
[52] U.S. Cl. .................................. 74/500.5; 74/502.4
[58] Field of Search ................ 74/501 R, 501 P, 512, 74/513, 502.4, 500.5; 192/111 A, 70.25, 30 W; 188/196 R, 196 M, 196 P

[56] References Cited

U.S. PATENT DOCUMENTS

| | | | |
|---|---|---|---|
| 1,993,907 | 3/1935 | Williams | 74/501 R |
| 2,848,216 | 8/1958 | McGurk | 74/513 X |
| 3,155,408 | 11/1964 | Peras | 292/216 |
| 3,196,706 | 7/1965 | Sevrence | 74/501 R |
| 3,411,373 | 11/1968 | Zieber et al. | |
| 4,420,988 | 12/1983 | Deligny | 192/111 A X |
| 4,456,101 | 6/1984 | Yamamoto et al. | 192/111 A X |
| 4,548,093 | 10/1985 | Nomura et al. | 74/512 |
| 4,621,937 | 11/1986 | Maccuaig | 74/501 R X |

FOREIGN PATENT DOCUMENTS

| | | | |
|---|---|---|---|
| 3013008 | 10/1981 | Fed. Rep. of Germany | 74/501 R |
| 1096590 | 6/1955 | France | 242/84.1 R |
| 0186527 | 11/1982 | Japan | 74/512 |
| 418749 | 10/1934 | United Kingdom | 74/501 R |
| 963979 | 7/1964 | United Kingdom | 74/513 |

Primary Examiner—Gary L. Smith
Assistant Examiner—Rodney M. Lindsey
Attorney, Agent, or Firm—Robert E. McCollum; Clifford L. Sadler

[57] ABSTRACT

A vehicle accelerator pedal push-pull type cable is connected from the accelerator pedal lever to the carburetor throttle lever through a support bracket that includes a flexible soft pliable sleeve type connector with a dumbell-like shape that permits extreme bending of the cable and connector during servicing and other operations, one end of the connector being secured within the bracket, the other end extending cantilever-like from the bracket and formed to resist separation from a dust tube surrounding the cable.

1 Claim, 1 Drawing Sheet

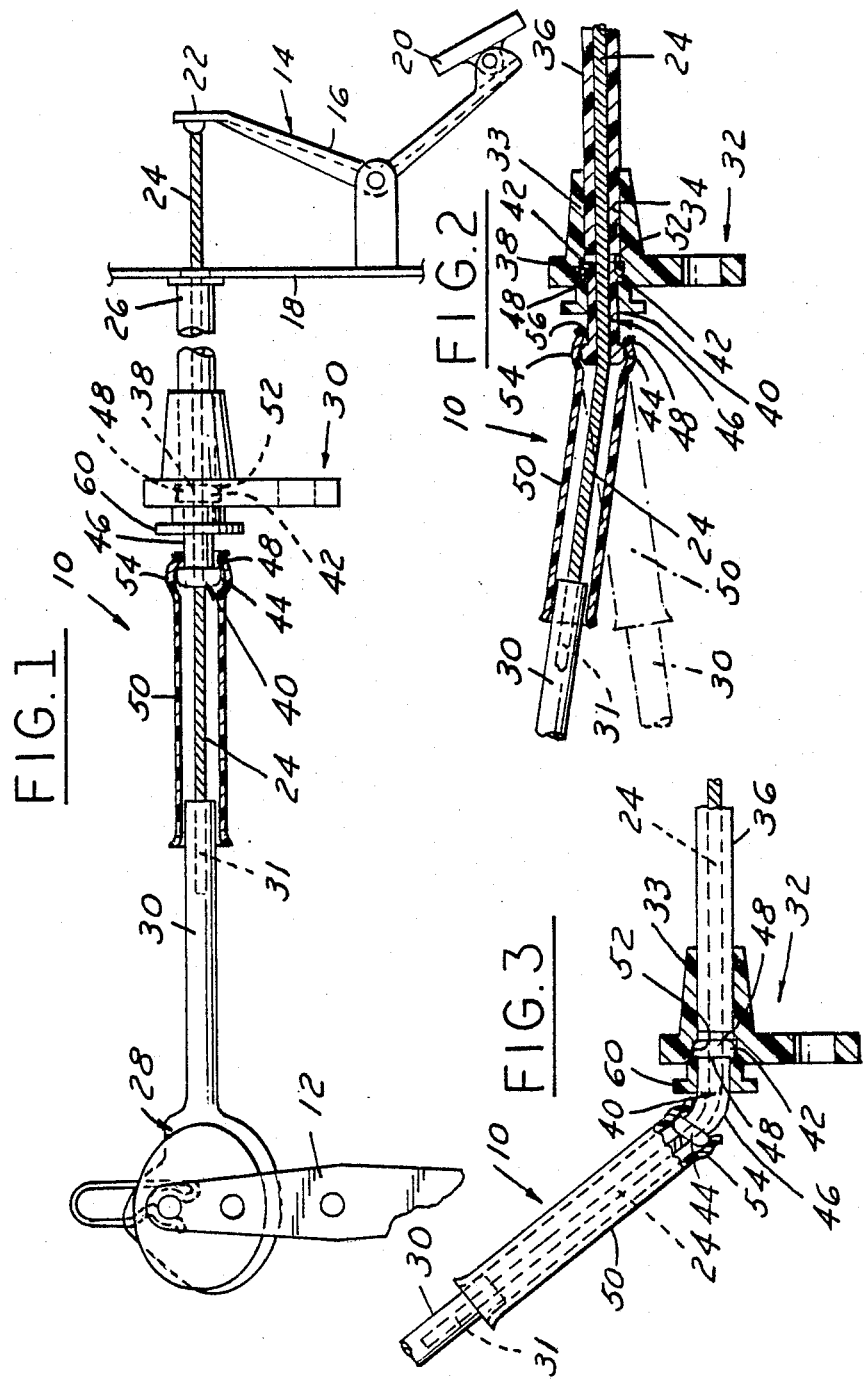

CABLE FLEXIBLE JOINT

This invention relates in general to a motor vehicle, and more particularly to a push-pull type cable assembly for connecting the vehicle accelerator pedal to the engine carburetor throttle control lever, as well as to other similar type connections.

An object of this invention is to provide a flexible cable assembly that permits extreme bending of the assembly during normal servicing/handling in the field of the vehicle in which it is installed. In the past, the typical push-pull cable assemblies used had fixed support brackets with the cable or its protective sheath rigidly attached to the bracket at the fire wall of the vehicle, for example. As a result, when maintenance was being performed, the cable often was pushed aside and bent to as much as 90° from its normal position to clear the way for a mechanic to perform the necessary maintenance operations. The cable assembly, therefore, often developed kinks in the assembly that could result in the device to be operated, such as, for example, the carburetor throttle lever, not being as accurate in its movement as before.

A primary object of the invention, therefore, is to provide a flexible joint in the cable assembly at the point of attachment to a stationary, rigid support bracket that will permit extreme bending of the cable assembly, this being accomplished in a simple, economical manner.

Cable assemblies having flexible joints are known in the prior art. For example, U.S. Pat. No. 1,993,907, Williams, shows a power transmitting device in which the push-pull cable is secured within a rigid housing or tube that surrounds a rod connected to a lever, the rod having a ball-type joint within the tube for a limited swivel movement with respect thereto within only a small angle.

U.S. Pat. No. 3,196,706, Sevrence, similarly shows a push-pull type cable housed within a rigid tube and connected thereto by a swivel-type joint which, however, again permits only a very limited swivel-type pivotal movement of the tube relative to the cable.

U.S. Pat. No. 3,411,373, Zieber et al, also shows a cable assembly having a ball and socket type connection with a tube, the ends of the socket cover, however, again limiting the angular movement of the tube to a small degree.

It will be noted that in all of the above prior art devices, no extreme bending of the push-pull cable assembly can be made without permanent damage to the assembly and, therefore, would not be suitable for use where such extreme bending may occur.

The invention eliminates the above disadvantages and objections by providing a flexible joint in the cable assembly that establishes a rigid connection to a support bracket and yet permits extreme bending of the cable to a position approximately 90° from its normal position, the bending being accomplished by the use of a soft pliable or resilient plastic material supporting the cable assembly through the bracket while permitting one portion of the assembly to be bent to an extreme degree.

Other objects, features and advantages of the invention will become more apparent upon reference to the succeeding detailed description thereof and to the drawings illustrating the preferred embodiment thereof; wherein, FIG. 1 is a cross-sectional view of a portion of a cable assembly embodying the invention; and FIGS. 2 and 3 are views of a portion of the assembly of FIG. 1 in different operative positions.

FIG. 1 shows schematically a push-pull type cable assembly 10 operatively connecting a carburetor throttle valve lever 12 to a conventional vehicle accelerator pedal lever 14. The latter is of a known construction consisting of a bell crank lever 16 pivotally supported upon the vehicle fire wall indicated at 18 and having at its lower end the foot pedal 20 for actuation by the vehicle driver. At its opposite end 22, the lever is connected to one end of a stranded Bowden wire type cable 24 suitably guided through the fire wall by means of a fitting 26 slidingly supporting the same.

The Bowden wire cable is a one-piece element of a suitable length as shown for connection at its opposite end to the lever 12. Lever 12 is pivotally connected to an operating lever 28 having a rod 30 within which is connected the end 31 of the stranded Bowden wire cable 24. It will be clear that depression of accelerator pedal 20 will pull the cable 24 to the right, as seen in FIG. 1, to pivot the throttle valve lever 12 in a valve opening direction. A return spring, not shown, would be connected to the lower part of lever 12 to cause a return movement of the cable upon release of the accelerator pedal.

Turning now to the invention, a bracket 32 is provided near one end of the Bowden wire cable for attaching and supporting the cable to a part of the vehicle structure, not shown. More specifically, the bracket consists of a molded body or fitting 33 having an axial opening 34 through which is inserted the cable assembly. The latter includes a sheath 36 loosely surrounding the stranded wire cable 24. The sheath in this case is fixedly secured within the hole or passage 34 in the fitting and is butted against one end 38 of a flexible sleeve 40.

The sleeve 40 has essentially a dumbbell-like shape with rounded end portions 42 and 44 constituting the ball-like portions of a ball and socket joint, for example. The reduced connecting portion 46 between the two end portions 42 and 44 provides shoulders or stepped portions 48 to anchor the sleeve both to the fitting 32 and to a dust tube 50 to be described. The fitting 32 in this case is matingly formed with a recess 52 for fixedly receiving the shouldered end 42 therein to prevent the sleeve from being pulled off under tension.

The opposite end of sleeve 40 protrudes axially outwardly from the fitting 32 in a cantilever-like manner for connection as stated to one end of the rigid steel or metal dust tube 50. The latter serves both as a dust tube to prevent the entry of foreign material to the flexible joint and also protects the Bowden wire cable 24 at this point. The end 54 of tube 50 contiguous to sleeve 40 has a somewhat bubble like shape in the form of a socket for cooperation with the ball-like end portion 44 of the sleeve 40 to constitute the ball and socket-like joint. The overlapping fit between the end 54 of the tube 50 and the shoulder 48 of sleeve 40 prevents the tube 50 from being pulled off during severe bending of the joint in a manner to be described.

As stated previously, the sleeve 40 is made of a soft, pliable or resilient plastic material that permits deformation and bending from a normal position as shown to one in which the end portion can be bent to an angle approaching 90° from the straight position. FIG. 3 illustrates the joint bent at a 45° angle. The softness of the shouldered portion 44 also permits the shoulder to be squeezed down during installation into the dust tube 50, but thereafter prevents separation of the two during bending, as also seen in FIG. 3.

A detailed description of the operation of the invention is believed to be unnecessary in view of the above description and a consideration of the drawings. However, in brief, during servicing of the vehicle in which the cable assembly is installed, the operating lever 28 would be disconnected from the throttle lever 12 for servicing of the carburetor or other component. The rod 30 and cable assembly 10 then would be pushed out of the way by the mechanic to any one of a number of positions including that shown in FIG. 3 and even further to a position not shown wherein the cable assembly might be located at approximately 90° from its normal straight position. During this operation, the soft, pliable plastic sleeve 40 can be bent as shown in FIG. 3, the sleeve 50 being retained upon the shoulder 44, the bending being permitted by the clearance between the end 54 of the tube and the adjacent portion 60 of the fitting.

As shown, the one end of tube 50 loosely surrounds the end 30 of the operating lever permitting slight angulation of the tube relative to the end 30. The opposite ball joint end also permits a similar but greater angulation of the tube 50 relative to the end 44 of sleeve 40, as clearly seen in FIG. 3. The flexible joint provided by sleeve 40 thus permits normal compliance of the dust tube 50 to the geometry of the throttle lever angle.

From the foregoing, it will be clear that the invention provides a flexible cable joint that permits extreme bending of portions of the cable assembly, as compared to other known constructions employing rigid support elements that prevent such extreme bending movements.

While the invention has been shown and described in its preferred embodiment, it will be clear to those skilled in the arts to which it pertains that many changes and modifications may be made thereto without departing from the scope of the invention.

I claim:

1. A flexible cable assembly for connecting a vehicle accelerator pedal to an engine carburetor throttle valve lever, comprising a flexible Bowden wire type cable fixedly connected at one end to a first movable lever and at its opposite end to a second movable lever for operation of the latter lever upon movement of the first lever, a stationary rigid support bracket intermediate to the levers, and flexible joint means operably supporting the cable in the bracket in a manner permitting a variable bending of the cable between a normal position and a position approximately at a right angle from the normal position and return to the normal position, a sheath surrounding and protecting the cable and fixedly secured within the support bracket for non-relative movement between the cable and sheath and bracket, the flexible means including a soft pliable bendable sleeve slidably receiving the cable therein with a frictional fit and rigidly connected at one end to the bracket and having a portion protruding from the support bracket at its other end for approximately a major portion of its length to permit bending of the sleeve between the original and right angle positions and return without damage to the sleeve or cable, a rigid dust tube surrounding and spaced from the cable and axially spaced from the support bracket, and ball and socket type connecting means connecting one end of the tube to the protruding portion of the bendable sleeve for a limited swiveling movement of the tube relative to the sleeve to maintain the interconnection between the tube and sleeve while accommodating bending of the sleeve from its normal position, the sleeve being symmetrically formed at opposite ends with a dumbbell-like shape providing shoulder-type ball joints at opposite ends for anchoring the sleeve both to the support bracket and to the tube, the tube having a socket-like end having a bubble-like shape overlapping the shoulder of the sleeve ball joint, the diameters of the bubble-like end and contiguous sleeve shoulder providing an interference fit between the tube preventing separation during severe bending movement of the sleeve and tube while permitting angular tilting movement of the tube upon the sleeve.

* * * * *